Patented Dec. 4, 1945

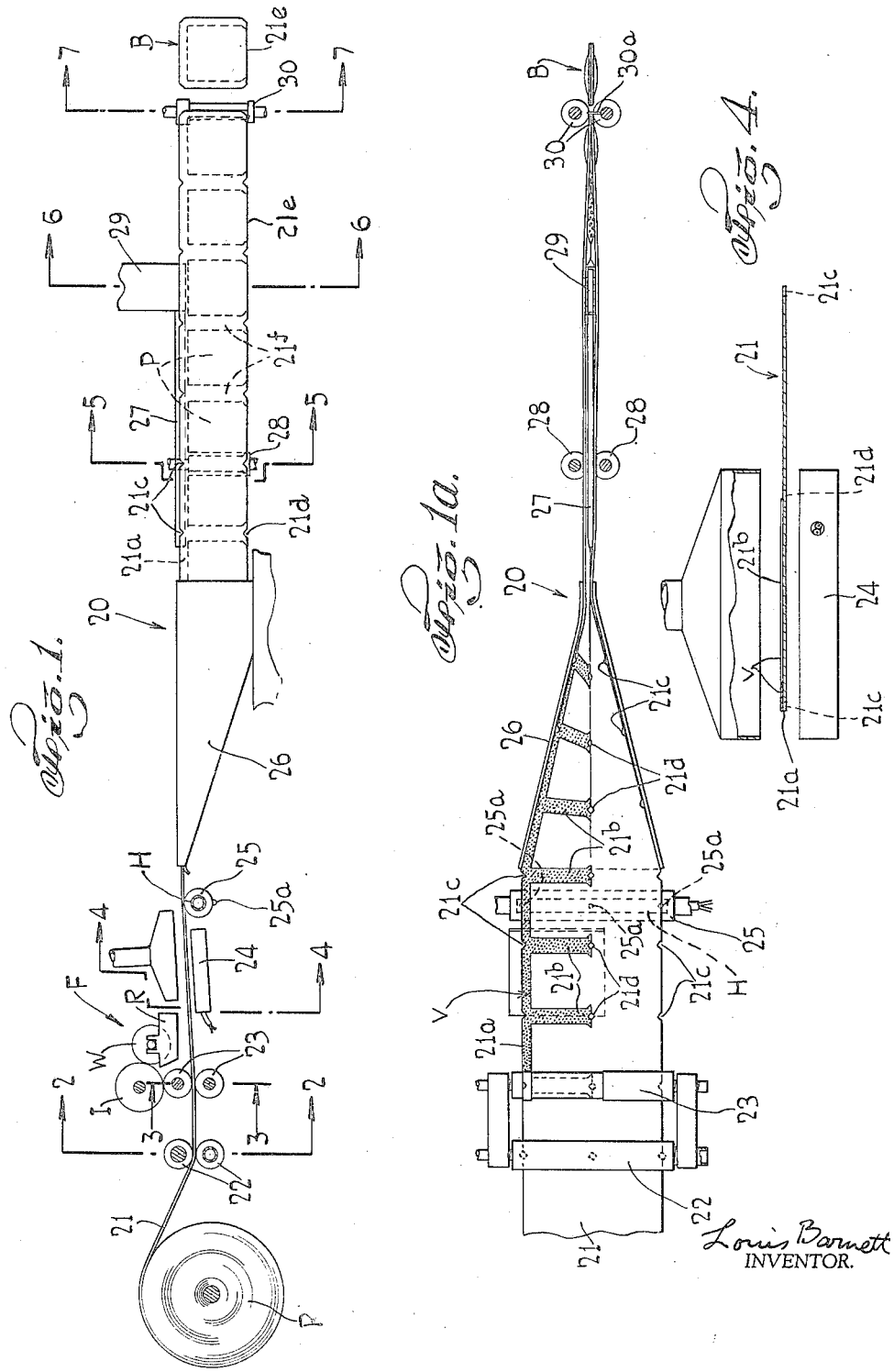

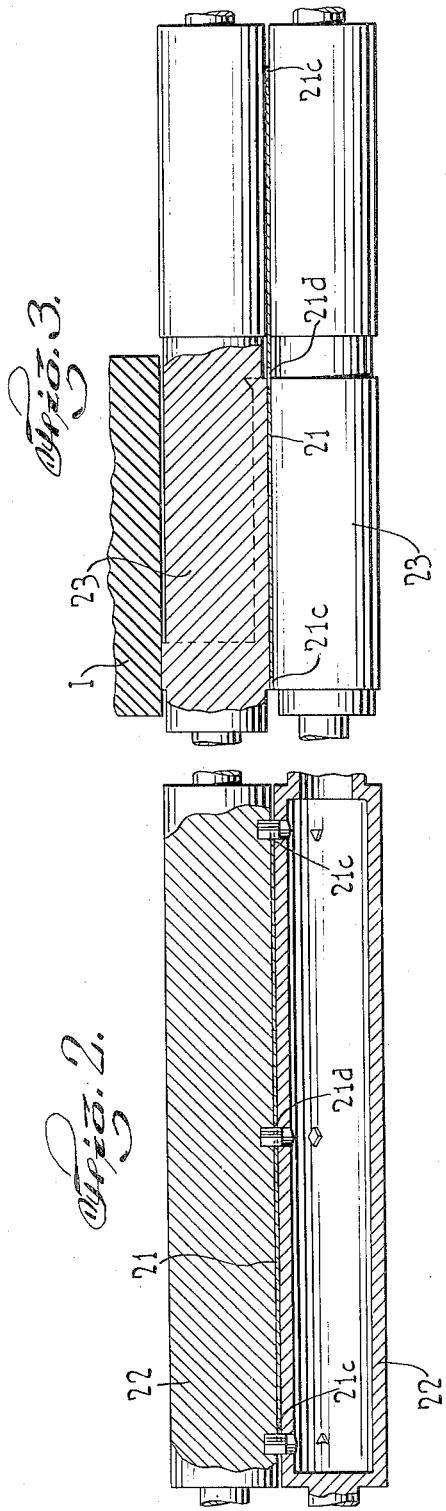
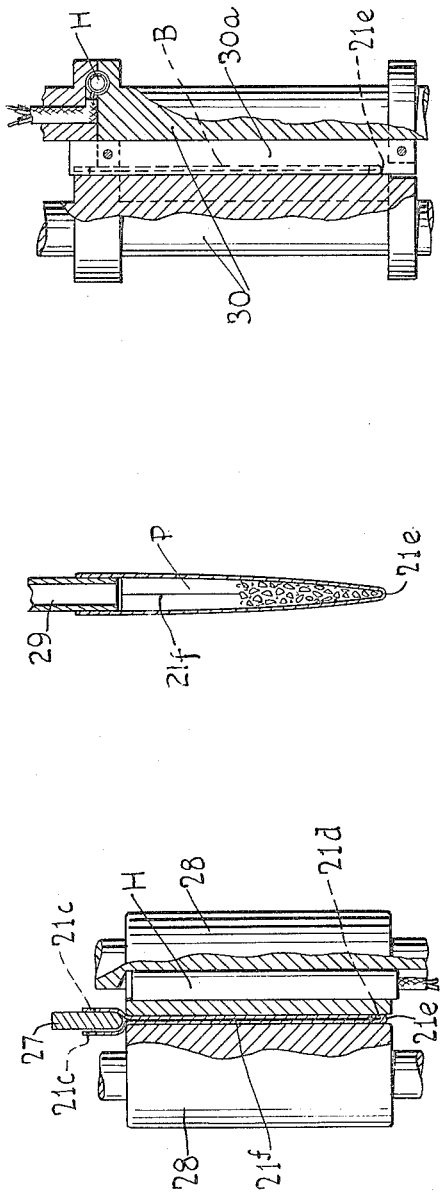

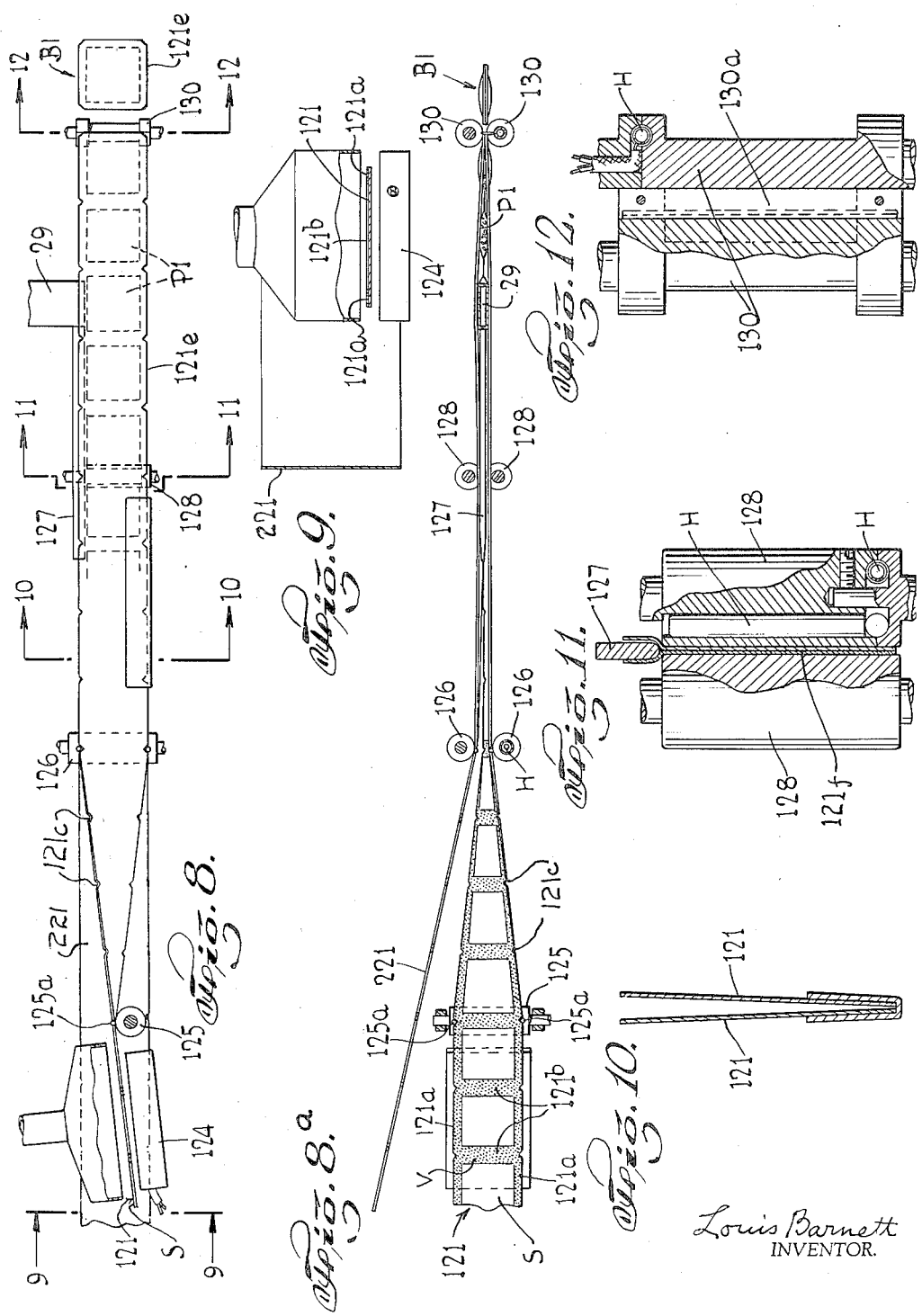

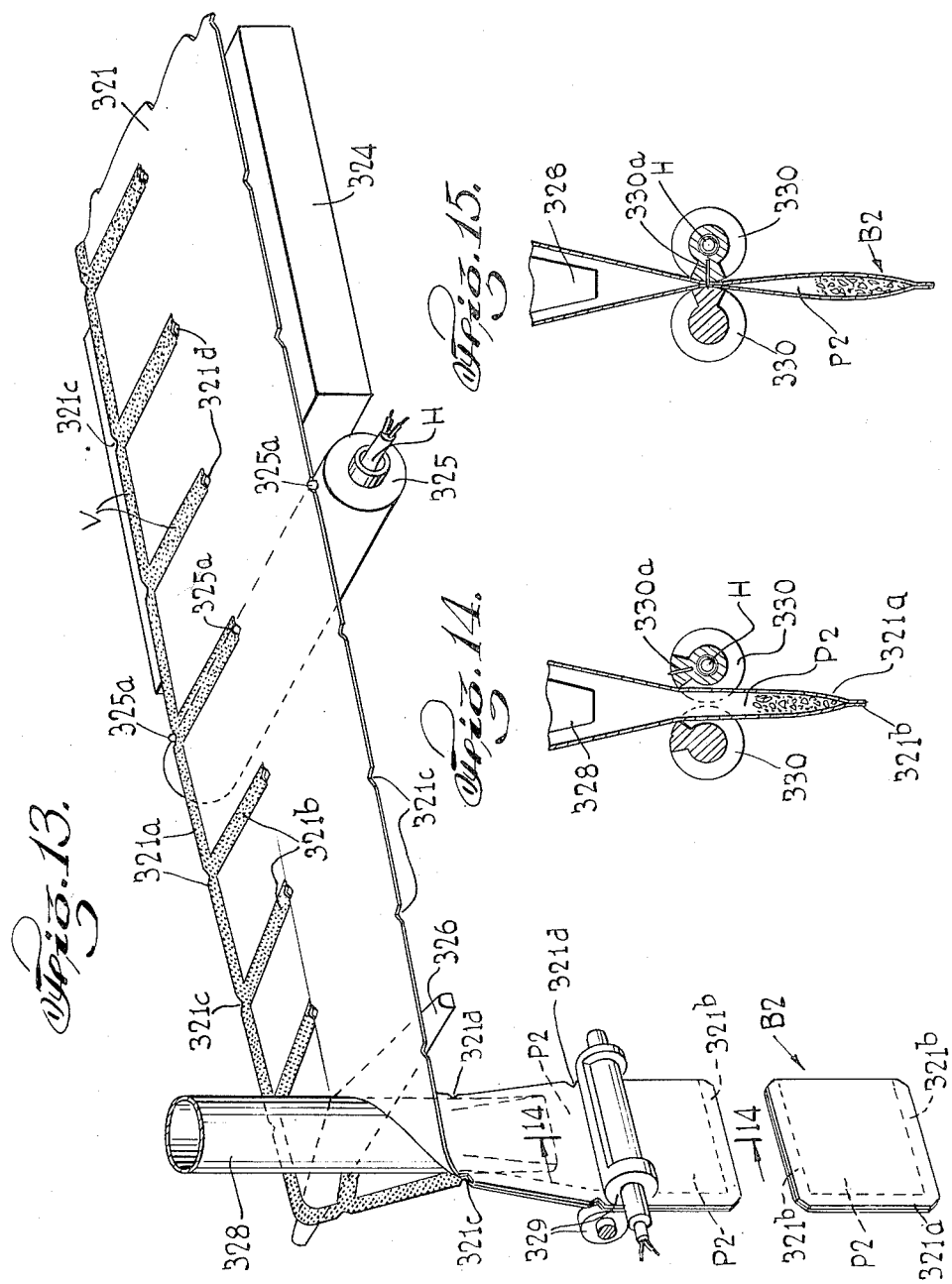

2,390,071

UNITED STATES PATENT OFFICE 2,390,071

INFUSION PACKAGE MANUFACTURE

Louis Barnett, Brooklyn, N. Y., assignor to National Urn Bag Company, Inc., Long Island City, N. Y., a corporation of New York Application October 9, 1941, Serial No. 414,332

11 Claims. (Cl. 93—3)

This invention relates to the manufacture of infusion packages, such as tea or coffee balls and the like articles.

Among the objects of the invention is to generally improve the manufacture of infusion packages of the character described, which shall require apparatus of few and simple parts assembled to form a rugged dependable structure, which shall permit economical manufacture especially in quantity production, and which shall be practical and efficient to a high degree in use.

In the manufacture of infusion packages, such as coffee or tea-balls, the enclosing bag must necessarily be constructed of a pervious sheet material which will permit the ready flow therethrough of the dissolved essence of the package contents when such balls are immersed in a liquid during a brewing operation in the well understood manner. Such bags of infusion packages when made with heat sealed seam or closure joints to eliminate sewn seams as is proposed in some of the recent developments of this art, particularly where the usual cotton gauze or perforated paper is replaced by sheet filter paper, have such joint constructions generally provided through either the incorporation of a heat sealing material as an integral part of the filter paper structure, or by coating the filter paper forming the bag with a thermo-setting lamina over one side of the filter sheet. With either the incorporation of said material or the application of the coating over the entire surface of the filter sheet, there is an excessive quantity of heat sealing material used since such material is only utilized at the adhering joint portions and it is desirable that the provision of such heat sealing material be controlled and managed so as not to interfere with the filtering capacity of the bag, namely, the filtering surfaces thereof which do not form part of the seam joint, and also to reduce to a minimum the foreign or inactive matter of immersion in making a brew. It is therefore also an object of the invention to provide for the manufacturing of such infusion packages whereby only sufficient heat sealing material is used as is required for satisfactorily making seam joints, thereby saving a large percentage of such material. and at the same time eliminating a decrease in filtering capacity, the invention being particularly applicable to an improved manufacture of such infusion packages which must because of the cheapness of the finished article be produced on automatic machines in quantity production.

Other objects of the invention will in part be obvious and in part hereinafter pointed out.

The invention accordingly consists in features of construction, combinations of elements and arrangement of parts which will be exemplified in the constructions and methods hereinafter described and of which the scope of the application will be indicated by the following claims.

In the accompanying drawings in which is shown various possible embodiments of the invention, Figs. 1 and 1a are side elevational and top plan views, respectively, showing the manufacture of infusion packages, such as tea or coffee balls embodying the invention. In Fig. 1a a dryer portion has been omitted to expose the traveling web;

Figs. 2, 3, 4, 5, 6 and 7 are cross-sectional views taken on lines 2—2, 3—3, 4—4, 5—5, 6—6 and 7—7, respectively, in Fig. 1;

Figs. 8 and 8a are side elevational and top plan views, respectively, similar to Figs. 1 and 1a, respectively, showing in part a modification of the improved manufacture of infusion packages embodying the invention;

Figs. 9, 10, 11 and 12 are cross-sectional views taken on lines 9—9, 10—10, 11—11 and 12—12, respectively, in Fig. 8;

Fig. 13 is a perspective view showing a further modification of the improved infusion package manufacture;

Fig. 14 is a cross-sectional view taken on line 14—14 in Fig. 13; and

Fig. 15 is a cross-sectional view similar to Fig. 14, showing the severing means in effective position when cutting off the leading finished filled and sealed package from that adjoining and only partially finished.

Referring in detail to the drawings 20 indicates an apparatus for manufacturing infusion packages, such as tea or coffee balls B embodying the invention. Through said apparatus a traveling layer web 21 passes continuously from a suitable supply source such as roll R through a pair of register punch rolls 22. then through applicator rollers 23 of a fountain source F for imprinting or otherwise applying a thermosetting material V continuously along one edge 21a and partially transverse the web as at 21b in an interconnecting U-shape formation, said partially transverse extending portion of the material being disposed in alignment with spaced edge and central openings 21c and 21d, respectively, produced by said punch rollers 22, as shown in Fig. 1a. The punched and imprinted layer web with the deposit is then passed through a suitable heating device 24, over a heated dryer roller 25, and then through a folder piece 26 which bows said web centrally on itself to provide a longitudinal bight or looped edge 21e, the latter extending substantially through an alignment of the inward ends of the imprinted partially transversing thermostatic material 21b and through the spaced central openings 21d which terminate said inward ends, as is clearly shown in Fig. 1a. The looped imprinted layer web 21, as it passes from the folder piece 26 may be disposed to have facing surfaces of the upper edges thereof retained apart by a guide bar 27 to prevent the upper coated web edge 21a from contacting the upper opposite uncoated edge of said web as shown in Figs. 1 and 1a. The transverse coated portions 21b, however, below the level of the coated web edges 21a and the guide bar 27, as seen from Fig. 5, are passed through heat sealing rollers 28 which are spaced from the folder 26 along the path of travel of the folded web to permanently seal joint the sections of the web together by said coated portions 21b, as indicated at 21f and shown in Figs. 1 and 5, so as to provide a continuous series of pockets P which have their upper sides retained open by the bar 27.

Spaced from said rollers 28 at least a sufficient distance to provide for the completion of said pockets P of said traveling layer web, there is a contents-filler, only the chute or spout portion of which is shown at 29. The latter extends down just short of the upper ends of the sealed portions 21f which form the upright sides of the pockets as seen from Figs. 1, 2 and 6. The contents-filler may be of any conventional type for measuring or weighing uniform amounts of essence containing material forming the infusion contents of the package, such as tea leaves or ground coffee, which when incorporated in an automatic packaging machine of any well known construction, empties a desired quantity of such contents to partially fill the successive pockets P as they travel pass thereunder.

Spaced further along the line of travel of said web now formed in a continuous adjoining series of filled pockets P, there is provided a pair of combination top sealing and unit severing cutter rollers 30. In passing through the latter, said upper edge border along 21a is permanently heat sealed to form joint seam closures of the pockets P, and the cutter or knife 30a of the rollers 30 severs the leading unit centrally along the transverse heated sealed portion 21f and through the upper sealed edge border to produce a detached finished infusion package B.

There is also provided suitable means such as spaced pins 25a upstanding from roller 25 arranged to mesh with the openings 21c and 21d as the layer web 21 travels thereover to prevent creeping of the latter and for positive aligning and keeping in register the pockets P formed by said web with the operation of the contents-filler in supplying the essence containing product through the spout 29. When such alignment from a formed pocket P to the spout 29 is determined and set, the travel of the web 21 will continuously proceed through the apparatus 20 always bringing each pocket P into register with the spout 29 so that the filling of the pocket P can be carried out in proper timed relation without spillage or other interruption.

The fountain source F may include a suitable receptacle R on which a usual pick-up roller W is mounted and which feeds the material V to the upper roller of the applicator 23 through a roller I in the well understood manner. The rollers 22, 23, 25, 28 and 30 may be driven through a suitable power transmission in any well known manner and rollers 25, 28 and 30 may be constructed with suitable electric heaters H, while apparatus 24 is heated by any conventional medium. In constructing roller 30, which may include the heater H, the knife or cutter 30a may be provided in the manner shown in Fig. 7.

The traveling layer web 21 from which the bags of the tea or coffee balls B are made, may preferably be formed of suitable filter paper sheet material in the form of a base layer, such as made from vegetable fibre pulp stock. Said layer preferably should have sufficient strength to retain the shape and form of said balls B on immersion in boiling water without damage or disintegration and serves to permit ready passage therethrough of the water of immersion for forming a brew and for straining the filling charge of tea or coffee contents T from passing out of the ball B. Said layer is of such composition that it is insoluble, non-toxic, and does not impart in the slightest degree any odor or taste to the brew and has no chemical reaction therewith.

As seen from Fig. 1 in preparing a filter paper layer web 21 for the manufacture of the tea or coffee ball B, the applicator rollers 23 may imprint or apply the thermosetting material V from the fountain source F in the form of a fluent material, as for example in a liquid or plastic state, or by thinly spreading the same in a dry finely divided condition over one side of the successive traveling surface along portions 21a and 21b of the filter paper layer 21, as described above and shown in Fig. 1a.

The thermosetting material V used may be a synthetic resin of the phenol, urea, formaldehyde, glycerol, phthalic, anhydride, acetylene, rubber and petroleum groups and provides the heat sealing means in the manner hereinafter described. The specific group of synthetic resins selected to produce the heat sealing material illustrating an embodiment of the invention may be a thermosetting polymerizing resinous product such as a suspension or a finely granulated powder of copolymer of vinyl chloride and vinyl acetate, which when applied to the web layer 21 by suitable means such as fountain source F and heated by device 24 and roller 25, will leave a substantially dry deposit in "partial fusion" on the layer web 21 which may be further treated in a heat sealing operation, as for example by pressure heat sealing in passing through rollers 28 and 30 described above in forming permanently fused seam joints such for example as at 21f of the balls B. Such seam joints will have no part thereof that will dissolve, give off any odor, alter the taste or otherwise impart any toxic or injurious effects as a food product when immersed in boiling water for brewing.

The layer web 21 imprinted with the deposited thermosetting material V to the portions of the surface thereof above described, when first heated by apparatus 24 and roller 25 is brought only to a "partial fusion" condition, that is, to a degree sufficient only to cause said material V to dry and adhere when initially in a liquid state, or to soften, flow and cohere when applied in a granular finely divided condition, thus forming a superficial coating or lamina at the impressed portions of the layer 21 in said interconnecting U-shaped formation as shown in Fig. 1a. The degree of heat applied to said material, however, should be insufficient to cause a permanent setting thereof. When said "partially fused" coating is a copolymer of vinyl chloride and vinyl acetate in powdered form, heating temperature of approximately 65° C. will be found satisfactory. In the permanent heat sealing of seam joints formed from a "partially fused" lamina as when portion 21f on the layer web 21 is passed through the heat sealing roller 28, and when permanently heat sealing the "partially fused" edge border closure along 21a in passing through the combination heat sealing roller 30, as described above, the temperature thereof should be raised to about 130° C.

It has been found in practice that a 6½ pound fibrous pulp stock sheet of approximately .001 inch thick forms a practical filter paper layer web 21 for the purposes described herein. On said layer web 21 the thermosetting material V when applied and "partially fused" thereon or dried as at 21a and 21b forms an extremely thin lamina of about .0005 inch thick.

Instead of using the filter paper layer web 21 described above, a filter cotton gauze or woven textile layer web may be substituted in practising the invention. The thermosetting material V when impressed thereon is retained by an absorption thereof on portions of the upper surface of the cotton strands. There also may be used as a filtering sheet material in place of layer web 21, finely perforated parchmentized paper, Cellophane, or the like, on which the thermosetting material V is applied in the same manner as described above for layer web 21 in manufacturing balls B.

In the form of the invention described above a single layer web 21 is used which is folded over on itself in the manufacture of the heat sealed package or ball B. It is, however, often desirable in practising the invention to use two superimposed layer webs rather than a folded web. To that end, the modified form of the invention shown in Figs. 8, 8a, 9, 10, 11 and 12 may be utilized. Here the upper surface S of one layer web 121 has imprinted, deposited or otherwise formed thereon by a suitable applicator, as for example in the manner described above for layer web 21, the thermosetting material V continuously along the opposite edges 121a and in spaced transverse sections 121b to form, as shown in Fig. 8a, a ladder shaped configuration. Said web 121 is passed through or over a suitable heated dryer means 124 including roller 125 "partially fusing" the imprinted or deposited material V thereon, and then said web 121 may be brought in a face to face relation with the companion web 221 by means of the pair of heated rollers 126. Said rollers 126 may be disposed with their axes in a right angle relation with respect to the axis of the roller 125, as is seen in Figs. 8 and 8a. A guide bar 127 is provided spaced from the rollers 126 to keep the upper edge portions of the layer web 121 and 221 separated, the rollers 128 serving to heat seal the "partially fused" portions and permanently unite only the lower edge portions 121e of the traveling webs 121 and 221 and at the same time permanently heat seal the transverse extending sections 121b just short of the upper web edge 121a, as at 121f, thereby forming the continuous row of pockets P1 in the same manner as described above and shown in Figs. 1 and 2. Here again a contents-filler with a spout or chute 29 is provided for partially filling the pockets P1 with the infusion contents and a set of combination cutter rollers 130 are provided for heat sealing the upper edges 121a and for simultaneously severing each of the leading unit infusion packages B1 that they pass through by knife or cutter 130a. The difference, as seen from Figs. 1 and 8, between the packages B and B1 formed, is that with the apparatus and method shown in Fig. 1 the package B has one edge 21e constructed with a loop or fold while the package or ball B1 produced by the apparatus and method formed in Fig. 8 has heat sealed closures extending completely thereabout without any folds.

The rollers 125, 126, 128 and 130 may be driven through a suitable power transmission, and the electric heaters incorporated in rollers 126, 127 and 129 may be like those described above for rollers 26, 27 and 29. A knife or cutter for the rollers 129 may be constructed like that shown in Fig. 12.

In the two forms of the invention above described the continuous method is characterized by utilizing a filling operation from a longitudinal side of the traveling webs, that is, in a direction at right angles with the direction of the traveling webs. It is contemplated in practising the invention to adopt the manufacture and production of the apparatus in which the filling operation is provided in the same direction as the traveling of the web. Such construction and manufacturing operation is shown in Figs. 13 to 15, inclusive, as applied to a single web 321. Said web may be imprinted in the identical manner as shown and above described in Fig. 1 in which a suitable applicator imprints, deposits or otherwise applies thermostatic material V continuously along one edge 321a and partially transverse the web as at 321b in the manner described above when using layer web 21. The web 321 passes over a heat and dryer roller 325 or other suitable device 324 so that the thermoplastic adhesive is "partially fused" and substantially dry, and then is folded around a hollow mandrel 328 by the use of a suitable guide former 326, said mandrel 328 serving as a spout or chute for the discharge from a suitable contents filler to supply measured or weighed quantities of infusion material to the partially formed pockets P2 of the folded web 321 as it leaves the lower end of the mandrel 328 immediately beneath which there is provided a pair of sealing and cutter rollers 329. These rollers not only continuously heat seal and form a continuous permanent joint along the edge 321a but also permanently heat seal the transverse portions 321b and in timed relation sever the filled leading bag as a completely sealed package B3. The rollers 325 and 329 may have suitable electric heaters H and the latter rollers may include a suitable cutter or knife construction at 330a operated as described above and shown in Figs. 13 to 15.

In the manufactures described above for packages B1 and B2 suitable means, similar to that set forth above for package B, for controlling the registry of the pockets P with the filling operation through spout and hollow mandrel may be provided, as for example, forming spaced edge perforations 121c in web 121 for meshing with pins 125a upstanding from the rollers 25, as shown in Figs. 8 and 8a, and openings 321c and 321d on web 321 for meshing with pins 325a upstanding from a roller 325, the latter being shown in Fig. 13.

In each of the above described manufactures of infusing packages B, B1 and B2, it will be noted that there is a great saving of material V used for heat sealing purposes since the effective filtering surfaces are left free thereof, thus permitting maximum unimpeded filtering capacity and at the same time reducing to a minimum the material forming part of the packages which do not contribute to the desired brew.

It is further contemplated in practising the invention to produce infusion packages from two layer webs instead of one layer web as described above and shown in Figs. 13 to 15, inclusive. In such manufacture the imprinted or deposited material V is applied to one of the layer webs as described for the production of package BI and shown in Figs. 8 to 12, inclusive, said layer webs then being formed about the spout-mandrel 328 as is readily understood from Fig. 13.

It will thus be seen that there is provided a package manufacture and apparatus in which the several objects of the invention are achieved and which are well adapted to meet the conditions of practical use.

As various other possible embodiments of the invention might be made of the above invention, and as various changes might be made in the embodiments above set forth, it is to be understood that all matters herein set forth or shown in the accompanying drawings and described in the specification is to be interpreted as illustrative and not in a limiting sense.

Having thus described my invention, I claim as new and desire to secure by Letters Patent:

1. An infusion package manufacturing apparatus comprising means for feeding a traveling filter sheet layer web continuously therethrough, means for perforating said web at spaced distances therealong, means for depositing and "partially fusing" a thermosetting lamina in configuration to form successive pockets on the moving web in a fixed aligned relation with respect to the web perforations, means for forming pockets with permanently heat sealed seam joints from said lamina and with filtering surfaces free from said lamina, means for filling said pockets with an essence containing product, and means for permanently closure heat sealing said product in the pockets and for severing a sealed unit including a filled pocket to provide a package of the character described, portions of said web feeding means including means coacting with said web perforations for controlling the position of the portion of the moving web with said lamina to register the pockets in proper alignment and in timed relation with respect to said filling means during the effective operation thereof.

2. An infusion package manufacturing apparatus comprising means for feeding a traveling filter sheet layer web continuously therethrough, means for perforating said web at spaced distances therealong, means for depositing and "partially fusing" a thermosetting lamina in configuration to form successive pockets on the moving web in a fixed aligned relation with respect to the web perforations, means for forming pockets with permanently heat sealed seam joints from said lamina, means for filling said pockets with an essence containing product, and means for permanently closure heat sealing said product in the pockets and for severing a sealed unit including a pocket to provide a package of the character described, portions of said web feeding means coacting with the web perforations for controlling the position of the portion of the moving web with said lamina to register the pockets in proper alignment and in timed relation with respect to said filling means during the effective operation thereof, said depositing means being effective to apply the lamina to form said pockets on less than the entire width of the traveling web, said pocket forming means including a folder piece for positioning a width portion of the web free from the lamina with relation to the web portion with said deposited lamina and with said web perforations.

3. In an infusion package manufacturing apparatus, means for feeding a continuous traveling filter sheet layer web, means for perforating the web at predetermined distances in advance of said feeding means, means for depositing a thermosetting lamina in a configuration to form successive pockets and in a fixed relation to said perforations, means for positioning the web in a face to face relation with the lamina therebetween, means for heat sealing pockets with permanently heat sealed joints from said lamina and with filtering surfaces thereof free from said lamina, means for filling said pockets with an essence containing product, and means in the path of travel of said web cooperating with said perforations so constructed and arranged that the pockets are kept in registered alignment with the operation of said filling means.

4. An infusion package manufacturing apparatus comprising means for continuously feeding a travelling filter sheet layer web carrying a dry thermosetting lamina in configuration to form successive pockets, continuously operating means for forming the continuously advancing web into pockets with permanently heat sealed joints from said lamina and with filtering surfaces free from said lamina, means for filling said pockets while they are advancing with an essence containing product, means for permanently closure heat sealing said product in the pocket while they are advancing, means for severing a leading filled pocket during said advancing movement to provide a unit package, and means disposed in the path of travel of the web for perforating same, said feeding means including portion constructed and arranged to cooperate with said web perforations for controlling the position of the pockets in proper alignment with the filling means.

5. An infusion package manufacturing apparatus comprising means for feeding a continuous traveling filter sheet layer web carrying a thermosetting material deposited in configuration to form successive pockets, means for "partially fusing" said material to form a dry lamina, means for forming pockets with permanently heat sealed seams from a portion of said lamina and with filtering surfaces free from said lamina while continuously advancing the web, means for filling the pockets formed with an essence containing product, means for permanently heat sealing the remaining portion of said lamina to confine the product in the continuously advancing pocket means for severing the continuously advancing web between adjoining pockets to provide a unit package, means incorporated in the path of travel of the web for perforating spaced portions of the web at uniform spaced distances and in predetermined relation to the configuration, and means for engaging said web perforations in timed and spaced relation for controlling the register of the pockets formed with respect to the filling means when in effective operation.

6. An infusion package manufacturing apparatus, comprising means for advancing a traveling filter sheet layer web continuously therethrough, means for perforating said web at spaced distance therealong, means for depositing and "partially fusing" a thermo-setting lamina in configuration to form successive pockets on the moving web in a fixed aligned relation with respect to the web perforations, means for folding the web longitudinally to position the lamina on an interior surface thereof, means for forming pockets by permanently heat sealing seam joints from the folded web along said lamina with filtering surfaces free from the lamina therebetween, means for filling said pockets with an essence containing product, said web advancing means including means coacting with said web perforations for controlling the position of the moving web with said lamina to register the pockets formed in alignment with the filling means during the effective operations of the latter.

7. An infusion package manufacturing apparatus comprising means for continuously advancing a traveling filter sheet layer web, means for perforating said web at spaced distances therealong while traveling, means for depositing and "partially fusing" a thermosetting lamina in configuration to form successive pockets on the moving web in a fixed aligned relation in respect to the web perforations, said depositing means being effective to apply the lamina on less than the entire width of the traveling web, a folder piece for positioning a width portion of the web free from the lamina with relation to web portion with said deposited lamina, means for permanently heat sealing seam joints from the web along the lamina to form said pockets, means for filling said pockets with an essence containing product, said web advancing means coacting with the perforations for controlling the position of the web to register each pocket formed in proper alignment with respect to said filling means during the effective operations thereof, means for permanently closure heat sealing said products in the pockets, and means for severing a sealed unit including a pocket along one of said seam joints to provide a package of the character described.

8. In an infusion package manufacturing apparatus, means for continuously advancing a filter sheet layer web, means for perforating the web at predetermined distances along the advancing web, means for depositing a thermosetting lamina in a configuration to form successive pockets and in a fixed relation to said perforating means, means for forming the pockets from said web by permanently heat sealing joints from said lamina, means for filling said pockets with an essence containing product, and means in the path of travel of the web for registering each pocket formed in aligning position with respect to the filling means during the effective operation of the latter.

9. An infusion package manufacturing apparatus as defined in claim 5 in which there is provided means for depositing the thermosetting material in said configuration to extend over one half the width of the travelling webs, and in which said pocket forming means includes means for folding the other integral half width of said web with relation to the deposited lamina.

10. In a method for continuously manufacturing infusion packages of the character described in which an essence containing product is enclosed in a heat sealed filter sheet material, the steps of perforating a continuously traveling layer web of said filter sheet material at spaced distances therealong, depositing a thermosetting lamina on the traveling web in a predetermined relation with respect to said perforations and in configuration to form successive pockets, forming pockets by permanently heat sealing seam joints from the lamina on said traveling of the web, positioning the web in face to face relation with the lamina therebetween, and filling the pockets with said product while controlling said filling with relation to the travel movement of the perforated positioned web portion.

11. In a method for manufa．uring infusion packages of the character described comprising perforating a continuously traveling sheet web layer at intervals longitudinally thereof, depositing a thermosetting lamina in configuration to form successive pockets with a greater part of the filtering surface of the continuously advancing web layer free from said lamina, positioning the web in a face to face relation with the lamina therebetween, forming pockets by permanently heat sealing portions of the lamina of the positioned web, filling the pockets formed successively with an essence containing product while retaining control of the continuous travel movement of the web through registering alignment of the perforations with respect to said filling operation, and permanently heat sealing the remaining portion of said lamina to seal said essence containing product in the pockets.

LOUIS BARNETT.